H. L. DOOLEY.
VARIABLE DROP SEED PLANTER.
APPLICATION FILED MAY 11, 1910.
1,176,821.
Patented Mar. 28, 1916.
4 SHEETS—SHEET 1.
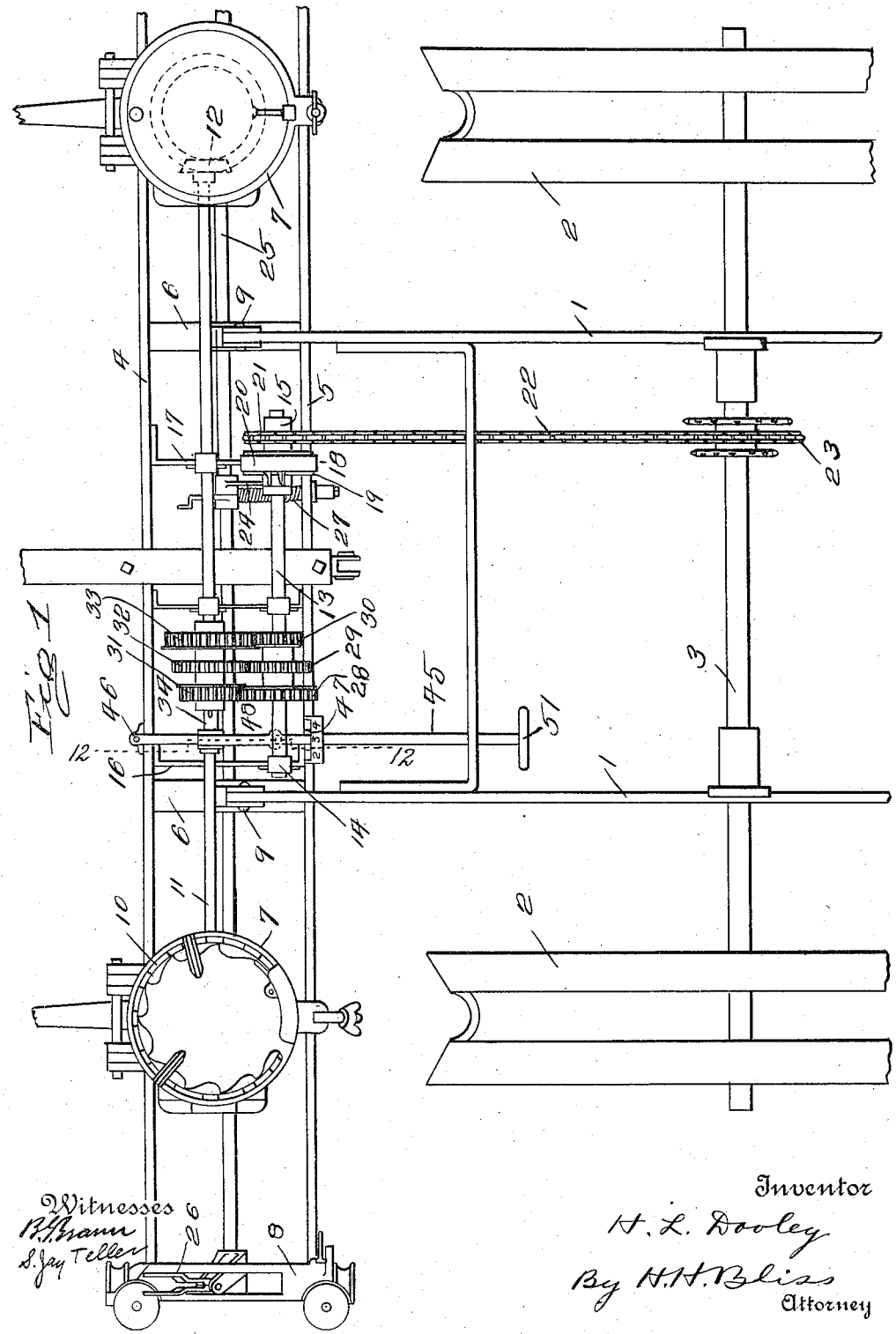
Witnesses
Inventor
H. L. Dooley
By H. H. Bliss
Attorney

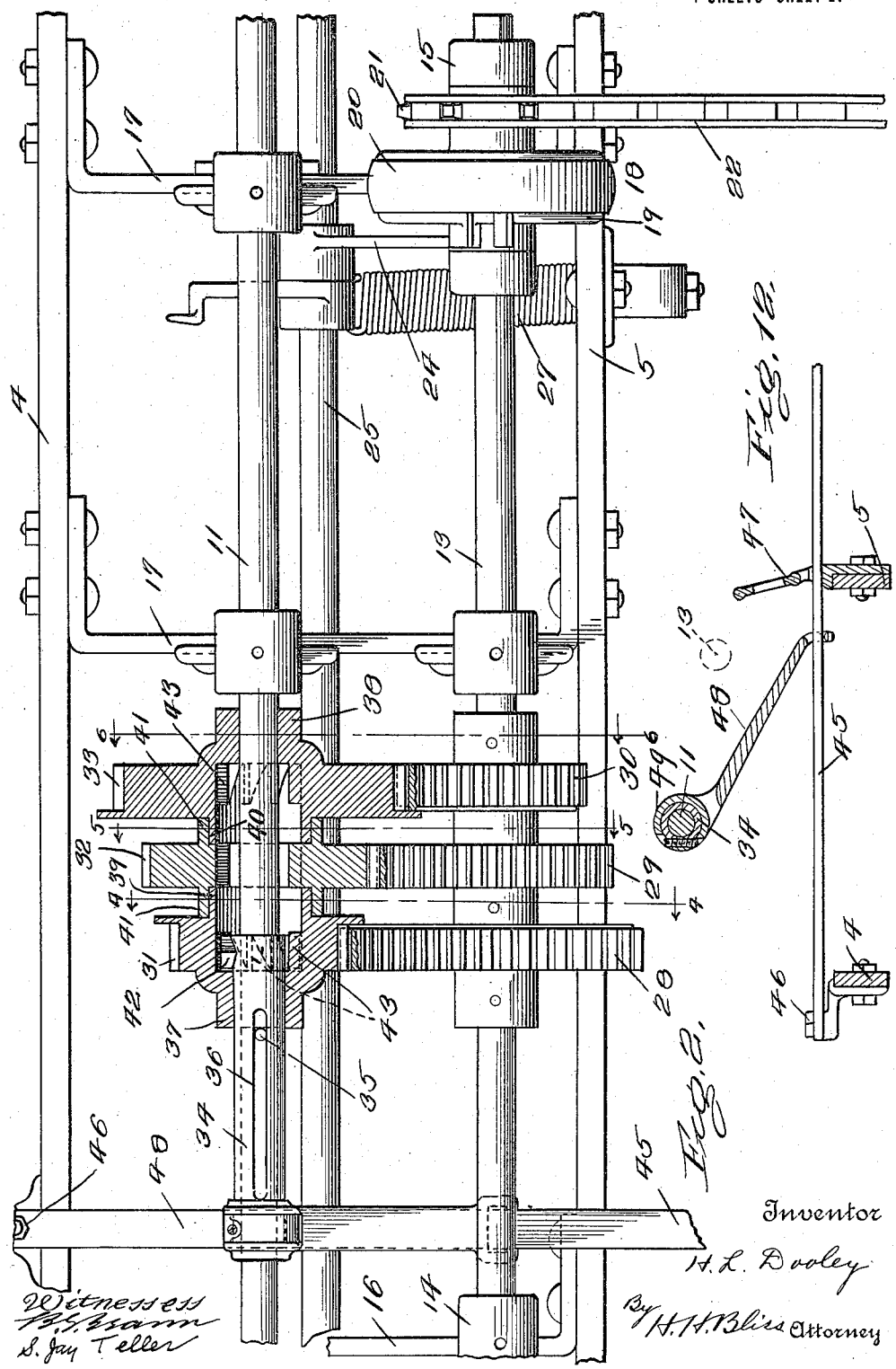

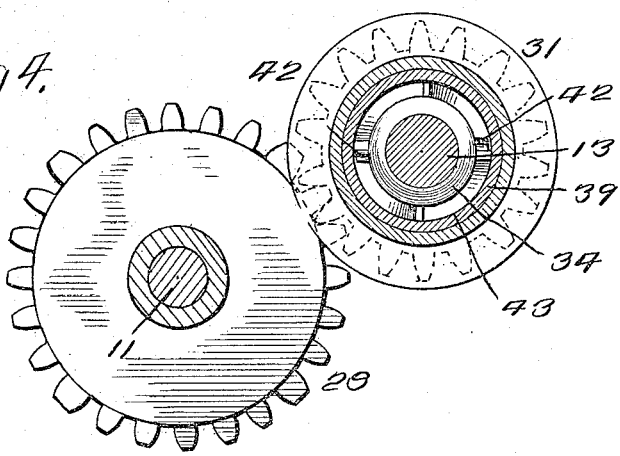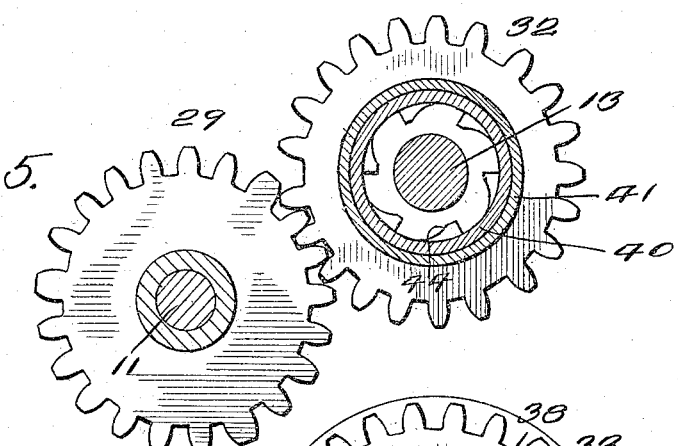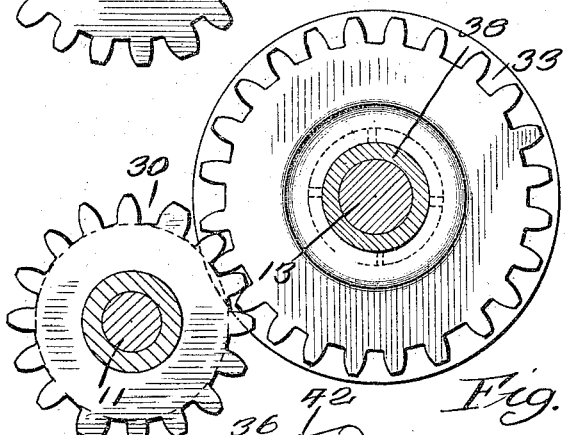

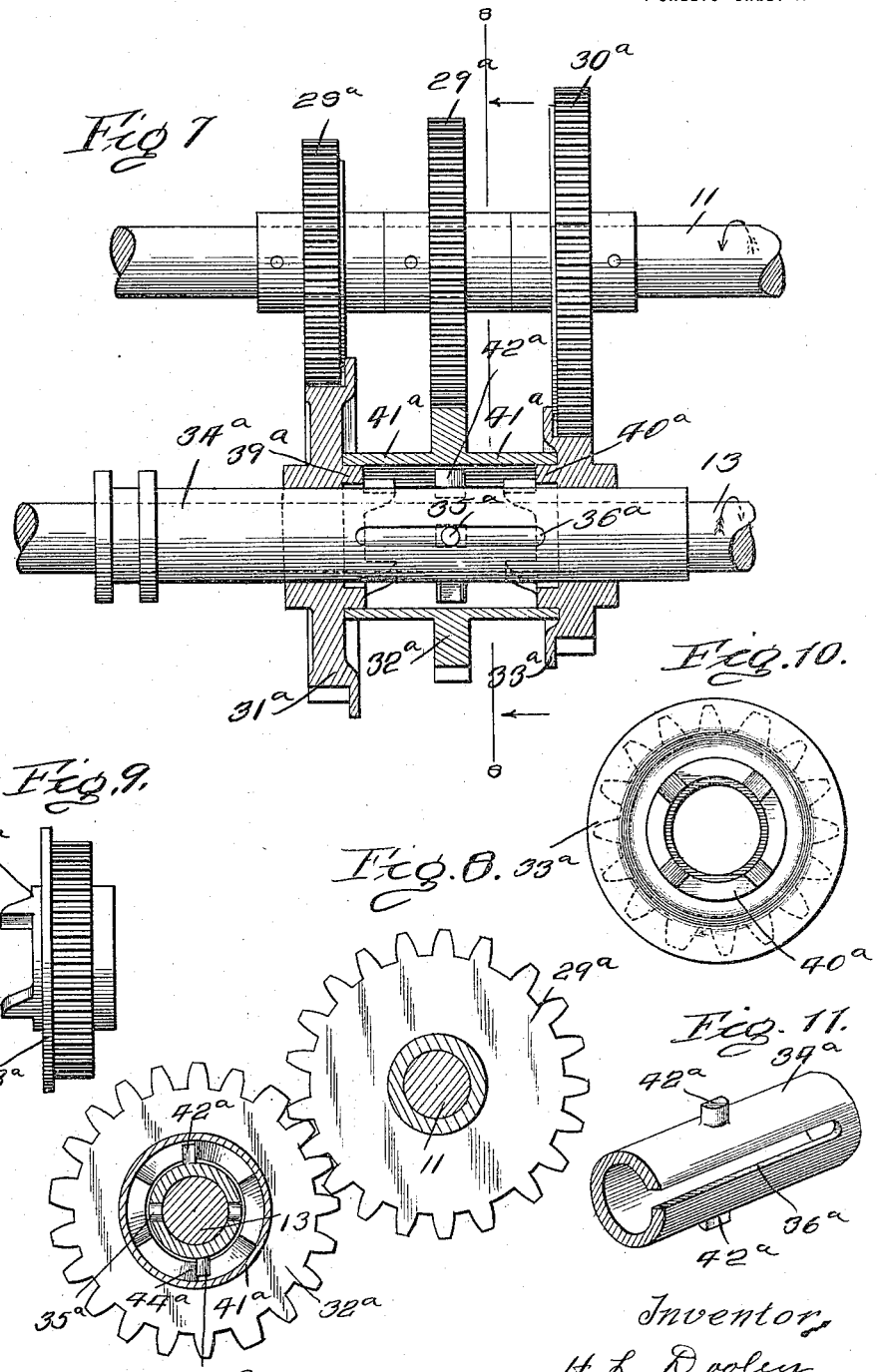

UNITED STATES PATENT OFFICE.

HARRY L. DOOLEY, OF ROCK ISLAND, ILLINOIS.

VARIABLE-DROP SEED-PLANTER.

1,176,821.  Specification of Letters Patent.  Patented Mar. 28, 1916.

Application filed May 11, 1910. Serial No. 560,642.

*To all whom it may concern:*

Be it known that I, HARRY L. DOOLEY, a citizen of the United States, residing at Rock Island, in the county of Rock Island and State of Illinois, have invented certain new and useful Improvements in Variable-Drop Seed-Planters, of which the following is a specification, reference being had therein to the accompanying drawing.

This invention relates to improvements in planters, and pertains more particularly to planters of the class in which use is made of a clutch controlled seeding mechanism, together with devices by which the action of the latter can be varied at will, by the operator.

The construction to which my present invention relates is similar in some respects to that disclosed in my co-pending application filed March 24, 1910, Serial Number 551,232, and my co-pending application filed April 2, 1910, Serial Number 553,065, and I do not therefore herein claim the improvements set forth in the said applications.

Of the accompanying drawings which illustrate one form of my invention, Figure 1, is a plan view of a planter embodying my improvements; a part of the planter is broken away to permit illustration on large scale. Fig. 2, is a fragmentary plan view partly in section showing the speed changing devices. Fig. 3, is a detail perspective view of the end of the sleeve on the seeder shaft. Fig. 4, is a fragmentary cross sectional view taken along the line 4—4 of Fig. 2. Fig. 5, is a fragmentary cross sectional view taken along the line 5—5 of Fig. 2. Fig. 6, is a fragmentary cross sectional view taken along the line 6—6 of Fig. 2. Fig. 7 is a fragmentary plan view partly in cross section, showing a modified form of my invention. Fig. 8 is a fragmentary cross sectional view taken along the line 8—8 of Fig. 7. Fig. 9 is a side view of one of the gears shown in Fig. 7. Fig. 10, is an end view of the gear shown in Fig. 9. Fig. 11, is a fragmentary perspective view of the sleeve on the clutch shaft, and Fig. 12 is a detail sectional view on line 12—12 of Fig. 1.

Referring to the drawings, 1, 1, represent the side bars of the main frame of the machine.

2, 2, are the driving and supporting wheels which are connected with the main axle 3, upon which the main frame is mounted.

4, 5, are the main bars of the transverse front frame of the planter which carries the planter mechanism proper. The bars 4 and 5 are connected by cross bars or braces 6, 6, by the frame plate seed hoppers 7, and by the check row heads 8, in the usual and well known manner. The front frame is pivotally connected to the main frame by bolts 9, 9, which pass through the front ends of the frame bars and upstanding brackets on the cross bars or braces 6, 6.

For purposes of illustration a two row planter is shown, the hoppers and seed separating mechanism being shown in duplicate, but it will suffice to describe one of the seed separating mechanisms as they are substantially similar. At the bottom of each of the hoppers 7, is a rotary seed plate, and this plate is driven from the seeder shaft 11 by interposed bevel gearing 12. This plate is, as shown in Fig. 1, one of the single-kernel-cell class; that is to say, one having cells each adapted to take from the mass in the seed receptacle one seed and carry it to, and under, the cut-off (see Fig. 1) and then deliver it to the discharge orifice, of the ordinary sort, at the upper end of the passage to the ground, and above one of the ordinary valves. On the central part of the transverse frame is mounted a clutch shaft 13, this shaft being supported in bearing brackets 14 and 15 which in turn are carried by transverse bars 16 and 17 on the front frame. On the shaft 13 is mounted a clutch 18 which comprises a disk part 19, keyed on the shaft 13 and a drum part 20, which is mounted adjacent the disk part so as to turn freely on the shaft 13. The drum 20 carries a sprocket wheel 21 and is continuously driven from the axle 3 by a sprocket chain 22 which passes over the sprocket wheel 21, and a sprocket wheel 23 on the axle.

The clutch 18 which I have shown embodies improvements which constitute in part the subject matter of my copending application, filed March 24, 1910, Serial Number 551,233. The clutch, however, is not shown in detail here, as the clutch itself constitutes no part of the present invention and clutches which operate in the same general manner are well known. It will suffice to say that the clutch comprises suitable pawl and ratchet mechanism by means of which the disk part 19 can be connected to the drum part 20 and be driven thereby.

Normally the pawl devices of the clutch are held in inoperative position by an arm 24, on the rocker shaft 25. At its outer ends the shaft 25, carries the check forks 26, which are constructed to operate in the usual manner. The check forks 26, the shaft 25 and the clutch arm 24 are held in their normal position by the spring 27, but when the check fork is engaged by a tappet on the wire, the fork is swung backward and with it is carried the shaft 25 and the arm 24. This movement of the arm 24 releases the pawl mechanism of the clutch allowing it to operatively connect the disk 19 to the rotating drum 20, so that said disk, and with it the clutch shaft 13, are made to turn with the drum 20. This movement of the shaft 13 continues for a half revolution, whereupon the clutch arm 24, having been returned to its normal position by the spring 27, the pawl mechanism of the clutch is engaged by said arm and moved to an inoperative position so that movement of the disk 19 and shaft 13 is stopped. This intermittent actuation of a rotating part, by means of a clutch mechanism controlled by the check forks, is well known and commonly employed in the art. But ordinarily the clutch mechanism is mounted directly upon the seeder shaft. In my improved machine however, the clutch is mounted upon a counter shaft 13 in the manner described, and the seeder shaft 11 is driven from the counter shaft by means of a gearing which is adapted to vary the amount of movement given the seeder shaft by the intermittent movement of fixed amount which is given the counter shaft 13 by the clutch mechanism.

The gearing comprises three spur gears 28, 29 and 30 which are of different sizes and which are rigidly fixed on the clutch shaft 13, and three spur gears 31, 32 and 33, which are mounted upon the seeder shaft 11 in mesh with the gears 28, 29 and 30, respectively.

In the preferred form of my invention as shown in Fig. 2, a sleeve 34 is provided on the seeder shaft 11. The sleeve is slidable on the shaft but is secured to it to rotate therewith by means of a pin 35 on the shaft which engages with a longitudinal slot 36 in the sleeve. The gear 31 is provided with a hub in the form of a hollow cylinder. The hub is provided with a laterally extended flange 37 which is adapted to engage with the sleeve 34 to form a bearing for the gear. The gear 33 is provided with a similarly laterally extending flange 38 which engages with the shaft 11 forming a bearing for the gear. The gears 31 and 33 are each also provided with lateral flanges 39 and 40 which serve as bearings for the annular flanges 41 of the gear 32. The gears 31 and 33 are each provided with shrouds which engage with the sides of the gears 28 and 30 to maintain the gears in proper position on the shaft 11.

It will be noted that the end of the sleeve 34 extends to a point within the hollow hubs of the gears 31, 32 and 33. The inner end of this sleeve is provided with teeth or lugs 42 of which there are preferably two. These lugs are preferably triangular in form in order to permit greater freedom of engagement with the gear clutch teeth to be described. Each of the gears 31 and 33 is provided with a series of teeth 43. The teeth are arranged in the upper part of the space within the hubs to permit the movement of the sleeve between them and each tooth has one surface in a plane radial to the axis of the gears. These plane faces are adapted to be engaged by the similar plane faces of the sleeve teeth 42. The opposite sides of the teeth 43 are sharply beveled to insure ready engagement with the sleeve teeth. Inward projecting teeth 44 are formed on the gear 32 and are adapted to be engaged in a similar manner by the sleeve teeth 42.

It will be noted that by means of the construction which has been described, any one of the gears 31, 32 or 33 may be connected with the shaft 11 by changing the position of the sleeve 34. The movement of the sleeve 34 relative to the shaft 11 is effected by means of a foot lever 45 which is pivoted at 46 on the transverse frame bar 4 and which extends through the notched bracket 47 on the frame bar 5. The lever is connected to the sleeve by an arm 48, the arm having a sleeve 49 which fits the groove 50 in the sleeve 34. The lever 45 is provided with a stirrup 51 for the operator's foot. The bracket 47 is provided with notches for the retention of the lever and preferably bears designating characters such as the figures 2, 3 and 4, which indicate the number of kernels which are being dropped when the lever is in any given position.

The operation of a planter embodying my improvements will be obvious from the foregoing description. When the lever 45 is set in position to hold the sleeve 34 in engagement with the gear 31, then each actuation of the clutch mechanism will move the seeder mechanism sufficiently to drop four kernels. With the sleeve in engagement with the gear 32, three kernels will be dropped. With the sleeve in engagement with the gear 33, two kernels will be dropped. The operator, by a simple movement of the lever 45 may vary the number of kernels at will without moving from his seat and without interfering with the continuous action of the planter.

It will be noted that I have shown in the drawings a seeder plate having twelve cells. Any desired number of cells can be used, however, but it is essential that the gearing ratios and the numbers of clutch teeth for engaging the different gears be properly determined. For purposes of illustration I have shown the gearing beneath the seeder plate as having a ratio of 1:2.

The following are the numbers of teeth on the gears shown in Figs. 4, 5 and 6:

|  | Number of clutch gear teeth. | Number of seeder shaft gear teeth. | Ratio. |
| --- | --- | --- | --- |
| Two kernel drop | 16 | 24 | 2:3 |
| Three kernel drop | 21 | 21 | 3:3 |
| Four kernel drop | 24 | 18 | 4:3 |

The actual number of teeth is, of course, theoretically immaterial, and it is only necessary to determine numbers which are adapted for practical use. It will be noted, however, that the gear ratios must vary in proportion to the numbers of kernels dropped.

It will be noted that I have shown six clutch teeth on each of the seeder shaft gears, though, if desired, three teeth might be used. It is necessary, however, that the numbers of clutch teeth on these gears be properly proportioned to the number of cells in the seed plate. As has been previously stated, the gear ratio between the seeder shaft and the seed plate is 2:1. It is essential that the rotation of the shaft through an angle corresponding to that between two clutch teeth move the seed plate through an angle corresponding to an integral number of teeth. With a seed plate having 12 cells, this is possible only when either three or six gear clutch teeth are used.

In Figs. 7 to 11, I have shown a modified form of my invention. The principal difference between this modified form and the construction previously described is that the sleeve indicated in the modification by 34ª is on the clutch shaft instead of on the seeder shaft. 28ª, 29ª and 30ª are spur gears rigidly connected with the seeder shaft 11. 31ª, 32ª and 33ª are spur gears meshing with the gears 28ª, 29ª and 30ª and are mounted on the sleeve 34ª which in turn is slidably mounted on the shaft 13 and rotatably secured to it by means of the pin 35ª in the slot 36ª. The gears 31ª and 33ª are mounted directly upon the sleeves 34ª while the gear 32ª is mounted by means of flanges 41ª on flanges 39ª and 40ª formed on the gears 31ª and 33ª. The gears 31ª and 33ª are provided with shrouds which engage the gears 28ª and 30ª and maintain the gears 31ª and 33ª in proper longitudinal position on the sleeve. The sleeve 34ª is provided with teeth or lugs 42ª which engage with teeth 43ª and 44ª on the gears.

It will be noted that the numbers of teeth on the gears of the modified form of my invention are the same as the numbers on the gears of the form before described.

It will also be noticed that I have shown in the drawings for purposes of illustration six clutch teeth on the central seeder shaft gear and four clutch teeth on each of the other seeder shaft gears. The numbers of these clutch teeth are also important as it is obviously desirable that the position of the seeder plate at the end of each actuation be the same regardless of which clutch tooth may have been engaged by the engaging element of the sleeve. The actual numbers may be varied, but I have found that this result is obtained when the number of clutch teeth is either a factor or multiple of the number of seed plate cells to be moved past the cut-off, that is, of the number of kernels to be dropped.

Among the advantages incident to my present invention is the fact that it is possible and entirely practicable to shift the speed changing device at any time whether the machine be in operation or not. This is made possible by the pointed edges of the clutch teeth and of the teeth on the sleeve. The readiness with which the mechanism may be shifted when the planter is in actual operation makes possible the changing of the number of kernels dropped from time to time at the will of the operator in accordance with soil conditions and without stopping the planter.

Another point to which attention should be directed is the fact that there is a neutral point between each pair of gears, so that one gear is entirely disengaged by the teeth or lugs of the sleeve before the other gear is engaged. This is found desirable, as otherwise the sleeve might be left in position with the lugs engaged with both gears, in which case, on account of the different speeds of the gears breakage would result.

The parts of the moving, or driving, train of devices, commencing with the ground-driven motor (the main axle on the rear frame, the sprocket chain and the prime part of the tappet-actuated clutch) and ending with the seed plate, are so arranged that there is a predetermined angular relation maintained between the various travel distances of the wheel, its places of stopping and starting, the number of and angular distances between the seed cells, the numbers of the gear teeth on the mating gears of the several differently speeded pairs, the sliding connector key, or clutch element, 42, and the counterpart connecting or clutch elements on the wheels 31, 32 and 33. The consequence of having these parts so correlated is that after the seed plate has been once properly put in position it is practically impossible under ordinary circumstances for it, when working, to get out of proper relationship to the discharge orifice or receptacle below it. While the sliding key or clutch element 42 is in engagement with either of the gears the plate is locked against displacement. And when this sliding connector or clutch element moves toward its position of engagement with any of the wheels its first effort (should the seed plate or its shaft 11 be, to the slightest extent, out of proper position) is to first bring them precisely to the predetermined point where the plate should commence its next movement.

It will be seen that three differently speeded drilling drivers are provided by the mechanisms shown and described which are constantly in proper relation to the seed plate. If the tappet-actuated devices of the main clutch be held out of action in any of the ordinary ways, the seed plate can be caused to rotate continuously and the adjustable connecting device or clutch element at 42 can be suitably set, according as the planting of the single kernels along the drill is desired at short intervals or at longer intervals. If the operator desires to drill the corn by dropping the kernels a few inches apart he sets the connector at 42 in engagement with the wheel 31. If, as he drives along, he finds a place where it is desirable to plant the kernels one by one at longer intervals along the ground he moves the connector into engagement with the wheel 32. And if, during this period of adjustment there should be any displacing of the seed plate, it is instantly brought back to a proper relative position as soon as the connecting element at 42 reaches the companion clutch elements in the wheel 32.

In the present instance the unit distance of travel of the plate is the arc distance from one single kernel cell to the next. When the parts are set for dropping two kernels to the hill the first kernel dropped by the plate must be caught and arrested in a receptacle, such as the ordinary valve chamber, and held therein until the second kernel is dropped. Similarly, when the parts are set for dropping three to the hill, the first and second kernels successively must be caught by the valve and held until the third cell in the plate has reached the delivery orifice and drops its kernel. The variable driving mechanism is, therefore, intimately correlated with the valve, or equivalent, which retains the seeds first dropped until the "hill" is complete, preliminary to dropping it to the ground.

When drilling, the valve, or equivalent, being out of action, and the passage for kernels being unobstructed from the plate to the ground, there is no accumulation of kernels in the receptacle or valve chamber, although the plate itself is still maintained in the same predetermined relationship to the variable driving gear.

What I claim is:—

1. In a corn planter, the combination of a frame, a seeder mechanism having a rotary single-kernel-cell plate adapted to travel with each of its movements over either of several distances which are multiples of a predetermined unit distance, a receptacle below the plate registering with the last cell of a series of cells predetermined to reach it at each movement of the plate, a prime ground-driven motor, two parallel shafts (driver and driven) on the frame between the motor and the seed plate, two differently speeded pairs of constantly meshing gear mates constantly held when active in predetermined relation to the aforesaid multiples of the travel distance of the plate, one gear mate of each pair being adapted to be actuated by the driver shaft, and the other mate of each pair being adapted to actuate the driven shaft, means intermittingly actuating the gear mates of the pairs, and optionally adjustable means for connecting the pairs of gear mates alternately to the driven shaft, the active elements of the said connecting means being angularly related to correspond with the predetermined varying distances of travel of the seed plate.

2. In a corn planter, the combination of a frame, a seeder mechanism having a rotary single-kernel-cell plate adapted to travel with each of its movements over either of several distances which are multiples of a predetermined unit distance, a receptacle below the plate registering with the last cell of a series of cells predetermined to reach it at each movement of the plate, a prime ground-driven motor, two parallel shafts (driver and driven) on the frame between the motor and the seed plate, two differently speeded pairs of constantly meshing gear mates constantly held when active in predetermined relation to the aforesaid multiples of the travel distance of the plate, one gear of each pair being actuated by and at every movement of the driver shaft and the other being mounted loosely but adapted to actuate the driven shaft, means intermittingly actuating the gear mates of the pairs, and optionally adjustable means for connecting the driven gear mates alternately to the driven shaft, the active elements of the said connecting means being angularly related to correspond with the predetermined varying distances of travel of the seed plate, substantially as set forth.

3. In a corn planter, the combination of a frame, a seeder mechanism having a rotary single-kernel-cell plate adapted to travel at each of its movements over either of several distances which are multiples of a predetermined unit distance, a receptacle below the plate registering with the last cell of the series of cells predetermined to reach it at each movement of the plate, a prime ground-driven motor, two parallel shafts (driver and driven) between the motor and the plate, two differently speeded pairs of constantly meshing gear mates and constantly held when active in predetermined relation to the aforesaid multiples of the travel distances of the plate, one gear of each pair being actuated by and at every movement of the driver shaft and the other being mounted loosely but adapted to actuate the driven shaft, means intermittingly actuating the driving gear mates of the said pairs, and adjustable connecting means for connecting the driven gear mate to the driven shaft, the active elements of the connecting devices being adapted to move the seed plate to the point of termination of one of its predetermined travel distances.

4. In a corn planter, the combination of a runner frame, two oppositely disposed feeder mechanisms each having a rotary plate with uniformly spaced single-kernel cells and adapted to travel at each of its movements over either of several distances which are different multiples of the distance from one cell to the next, a kernel receptacle below each plate registering with the last cell of the series of cells predetermined to reach it at each movement of the plate, a shaft 11 adapted to transmit rotary movement to both of the seed plates in common, a shaft 13 mounted on the runner frame parallel to the shaft 11, two differently speeded pairs of gear mates, one gear of each pair being a driver and the other being a driven gear, adapted to move shaft 11 and both seed plates through one of the said predetermined multiple distances, one gear mate of each pair being loosely mounted relative to shaft 11 and the other mate of each pair being rigidly mounted relative to shaft 13, and the mates of each pair being constantly in mesh, a continuously acting prime driver, a tappet actuated clutch having a member adapted to be driven through successive predetermined distances, and a supplemental clutch device on the shaft 11 for connecting the driven element of the tappet actuated clutch to the driven mate of each gear pair at will, said supplemental clutch having its active elements angularly related to the predetermined varying distances of travel of the seed plates.

5. In a planter, the combination of a seeder shaft, driving connections adapted to intermittently connect the seeder shaft to the axle for repeated definite movements, a seed separating plate, a gear connected with the plate to drive it, a plurality of series of gear teeth, the series being of different diameters and arranged about a common axis, a series of pinions arranged to rotate about a transverse axis, the pinions permanently meshing respectively with the said series of teeth, and a rotating key slidable transversely into engagement with any one of the pinions, each of the pinions being provided with key receiving keyways, the numbers and positions of the keyways being such that a keyway of each pinion is in alinement with the key at the end of each actuation of the shaft and pinions.

6. In a corn planter, the combination of a frame, two oppositely disposed seeder mechanisms, each having a rotary plate with uniformly spaced single kernel cells and adapted to travel at each of its movements over either of several distances which are differing multiples of the distance from one cell to the next, a kernel receptacle below each plate registering with the last cell of the series of cells predetermined to reach it at each movement of the plate, a shaft 11 driving the seed plates in common, two differently speeded pairs of gear mates situated between the two seeding mechanisms, one gear of each pair being a driver and the other being a driven gear which when power actuated moves shaft 11 and both seed plates through one of the said predetermined multiple distances, the mates of each pair being on parallel axes and constantly in mesh, a continuously acting prime driver actuated from the ground wheels, a tappet actuated clutch having a normally idle driven member for transmitting parts of said power through predetermined successive cycles to the said driving gears of the mated pairs, and a supplemental clutch device for connecting the driven element of the tappet actuated clutch at will to the said pairs of gear mates alternately, the active elements of the said supplemental clutch being angularly related to correspond with the predetermined varying travel distances of both the seed plates.

In testimony whereof I affix my signature, in presence of two witnesses.

HARRY L. DOOLEY.

Witnesses:
  OSCAR F. LUNDAHL,
  ROBERT M. ADAMS.

Copies of this patent may be obtained for five cents each, by addressing the "Commissioner of Patents, Washington, D. C."